United States Patent
Spindler et al.

(10) Patent No.: US 6,690,989 B2
(45) Date of Patent: Feb. 10, 2004

(54) CLOSED-LOOP PHASE COMPENSATION CONTROLLER

(75) Inventors: Kent J. Spindler, Inver Grove Heights, MN (US); Robert J. Carlin, White Bear Lake, MN (US); Steven A. Cinnamon, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 51 days.

(21) Appl. No.: 10/100,647

(22) Filed: Mar. 19, 2002

(65) Prior Publication Data

US 2003/0181999 A1 Sep. 25, 2003

(51) Int. Cl.[7] .............................................. G06F 19/00
(52) U.S. Cl. ..................... 700/170; 700/275; 318/163; 250/231.18
(58) Field of Search .................... 318/163, 461, 318/779, 560; 250/231.18, 231.17; 700/275, 304, 170

(56) References Cited

U.S. PATENT DOCUMENTS

| | | | |
|---|---|---|---|
| 4,651,068 A | | 3/1987 | Meshkat-Razavi |
| 5,157,597 A | | 10/1992 | Iwashita |
| 5,228,070 A | | 7/1993 | Mattson |
| 5,412,302 A | | 5/1995 | Kido et al. |
| 5,545,957 A | * | 8/1996 | Kubo et al. .................. 318/432 |
| 5,646,496 A | * | 7/1997 | Woodland et al. ........... 318/779 |
| 5,952,804 A | * | 9/1999 | Hamamura et al. .......... 318/560 |
| 6,127,793 A | * | 10/2000 | Kerner ......................... 318/561 |
| 6,219,376 B1 | | 4/2001 | Zhodzishsky et al. |

FOREIGN PATENT DOCUMENTS

| WO | WO 96/15583 | 5/1996 |
|---|---|---|

OTHER PUBLICATIONS

"Robust Two Degree of Freedom Regulators for Velocity Ripple Elimination of AC Permanent Magnet Motors", *2001 Institution of Electrical Engineers*, 1995, Wai–Chuen Gan, Li Qiu, Abstract.

"Self–Learning Controller for the Compensation of Periodic Disturbances in Continuous Processing Plants", Martin Rau and Dierk Schröder, pp. 1275–1282, 2000 IEEE.

"Adaptive Algorithms For the Rejection of Sinusoida Disturbances with Unknown Frequency", *Automatica*, vol. 33, No. 12, pp. 2213–2221, 1997.

"A New Approach to Phase Cancellation in Repetitive Control", Harold Broberg and Richard Molyet, pp. 1766–1770, 1994 *Institution of Electrical Engineers*.

"An Adaptive Repetitive Control Scheme For Tracking Periodic Signals With Unknown Period", Proceedings of the American Control Conference, San Francisco, CA, Jun. 1993, pp. 1736–1740.

(List continued on next page.)

*Primary Examiner*—Albert W. Paladini
(74) *Attorney, Agent, or Firm*—Brian E. Szymanski

(57) ABSTRACT

An adaptive closed-loop controller is described that reduces repetitive speed variations of precision rotatable mechanical components, such as rollers, casting wheels, pulleys, gears, pull rollers, extruders, gear pumps, and the like. A system is illustrated in which the controller is coupled to a motor for driving a rotatable mechanical component in response to a motor control signal. A sensor is mounted to the shaft of the mechanical component, and generates a speed signal representing angular velocity of a mechanical component. The controller receives the speed signal, and generates a set of data elements to relate speed variations of the mechanical component to a plurality of angular positions of the mechanical component over one or more revolutions. The controller generates an error signal based on the data elements and introduces the error signal into closed-loop control circuitry to provide adaptive control over the mechanical component.

45 Claims, 12 Drawing Sheets

OTHER PUBLICATIONS

"Research Project on Repetitive Control For Dynamic Material Testing", Internal Research Document, X.C. Tan and T.C. Tsao, University of Illinois at Urbana–Champaign, Oct. 18, 1998, pp. 1–44.

"Analysis and Synthesis of Discrete–Time Repetitive Controllers", *Journal of Dynamic Systems, Measurement, and Control*, Tomizuka et al, Sep. 1989, vol. 111, pp. 353–358.

"Nonlinear Control of an Electrohydraulic Injection Molding Machine via Iterative Adaptive Learning", Submitted to *Institution of Electrical Engineers*/ASME Transactions on Mechatronics Jul. 1998, Heather Havlicsek and Andrew Alleyne, pp. 1–25.

* cited by examiner

| POSITION | VELOCITY ERROR DATA |
|---|---|
| $P_1$ | +1.2004 |
| $P_2$ | -0.8766 |
| $P_3$ | -0.5667 |
| $P_4$ | +1.5643 |
| $P_5$ | +0.9004 |
| ... | ... |
| $P_{N*M}$ | +0.4232 |

FIG. 7

| | FREQUENCY | AMPLITUDE | PHASE |
|---|---|---|---|
| $F_1$ | 0.9788 Hz | 1.2004 | 30.005° |
| $F_2$ | 0.5788 Hz | 0.8766 | 197.034° |
| $F_3$ | 1.245 Hz | 2.5667 | 275.453° |
| | | | |
| $F_x$ | 2.9788 Hz | 3.9004 | 94.944° |

FIG. 8

CLOSED-LOOP PHASE COMPENSATION CONTROLLER

TECHNICAL FIELD

The invention relates to closed-loop control systems, such as systems for controlling manufacturing processes.

BACKGROUND

Continuous feed manufacturing systems, such as manufacturing systems used to produce paper, film, tape, and the like, often include one or more motor-driven rotatable mechanical components, such as rollers, casting wheels, pulleys, gears, pull rollers, extruders, gear pumps, and the like. These systems often include electronic controllers that output control signals to engage the motors and drive the motors at pre-determined speeds. A typical controller often includes sophisticated closed-loop control circuitry that monitors the speed of the motor and adjusts the output signals to compensate for any detected error.

Nevertheless, the rotatable mechanical components of these systems tend to experience speed variations, often due to the other mechanical components coupling the motor to the rotatable mechanical component. For example, speed variations may be introduced by gear boxes, mechanical couplers, bearing friction, cogging torque, gain offset of sensors and other anomalies within the system. These speed variations during the manufacturing process can lead to imperfections or variations within the manufactured product. Accordingly, it is desirable to reduce or eliminate the speed variations such that the rotatable members can be driven as closely as possible to a desired velocity.

SUMMARY

In general, the invention relates to adaptive closed-loop control techniques that reduce speed variations of precision-controlled rotatable mechanical components. In particular, the adaptive, closed-loop control techniques described herein can dynamically detect and reduce speed variations even though the speed variations may shift in amplitude, frequency and phase during the rotation. Exemplary rotatable mechanical components include, for example, rollers, casting wheels, pulleys, gears, pull rollers, extruders, gear pumps, and the like.

In one embodiment, the invention is directed to a system having a motor operable to drive a rotatable mechanical component in response to a motor control signal. A sensor generates a speed signal that represents the angular velocity of the mechanical component. The sensor may be, for example, a sine encoder mounted to a shaft of the mechanical component. A controller receives the speed signal, and generates a set of data elements based on the speed signal over one or more revolutions of the mechanical component.

In particular, the set of data elements relate speed variations of the mechanical component to a plurality of angular positions of the mechanical component. For example, the set of data elements may comprise angular velocity error data for the mechanical component at each of the angular positions. Alternatively, the controller may decompose the speed signal into frequency components, and identify destructive frequencies. In that case, the set of data elements may comprise frequency, amplitude and phase data for the components.

The controller continuously monitors the speed signal, updates the set of data elements, and adjusts the motor control signal based on the set of data elements. In this manner, the controller provides adaptive, closed-loop control of the mechanical component. The controller may, for example, generate an error signal based on the set of data values, and induce the error signal into closed-loop control circuitry as feedback to adjust the motor control signal. To generate the error signal, the controller makes use of a motor reference signal, such as a motor speed reference signal, a motor torque reference signal, or a motor position reference signal.

The controller maintains the set of data elements within a storage medium, such as a non-volatile random access memory (NVRAM), FLASH memory or the like. In particular, the controller may store the set of data elements as a lookup table (LUT) in which the data elements store angular velocity error data for the angular positions of the mechanical component. For example, the lookup table may comprise $N*M$ data elements, where the $N*M$ data elements store angular velocity data for N angular positions over M revolutions of the mechanical component.

The controller continuously updates the data elements in real-time to provide adaptive control and effectively reduce the speed variations. For example, for each angular position, the controller calculates an average velocity of the mechanical component over a subset of the proceeding angular positions, and subtracts the average angular velocity from a reference velocity to produce a current velocity error. The controller then updates the respective data element based on the current angular position of the mechanical component and as a function of the calculated velocity error.

In another embodiment, the invention is directed to a method comprising receiving a speed signal representing angular velocity of a rotatable mechanical component, and generating a set of data elements from the speed signal. The set of data elements relates speed variations of the mechanical component to a plurality of angular positions of the mechanical component. The method further comprises generating an error signal based on the set of data elements, and adjusting a motor control signal based on the error signal. The set of data elements may comprise angular velocity error data for the mechanical component at the angular positions. Alternatively, the data elements may comprise frequency, amplitude and phase data for frequency components of the speed signal.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 7 is a block diagram illustrating an example set of the data elements.

FIG. 8 is a block diagram illustrating another example set of the data elements.

DETAILED DESCRIPTION

Figure 1:
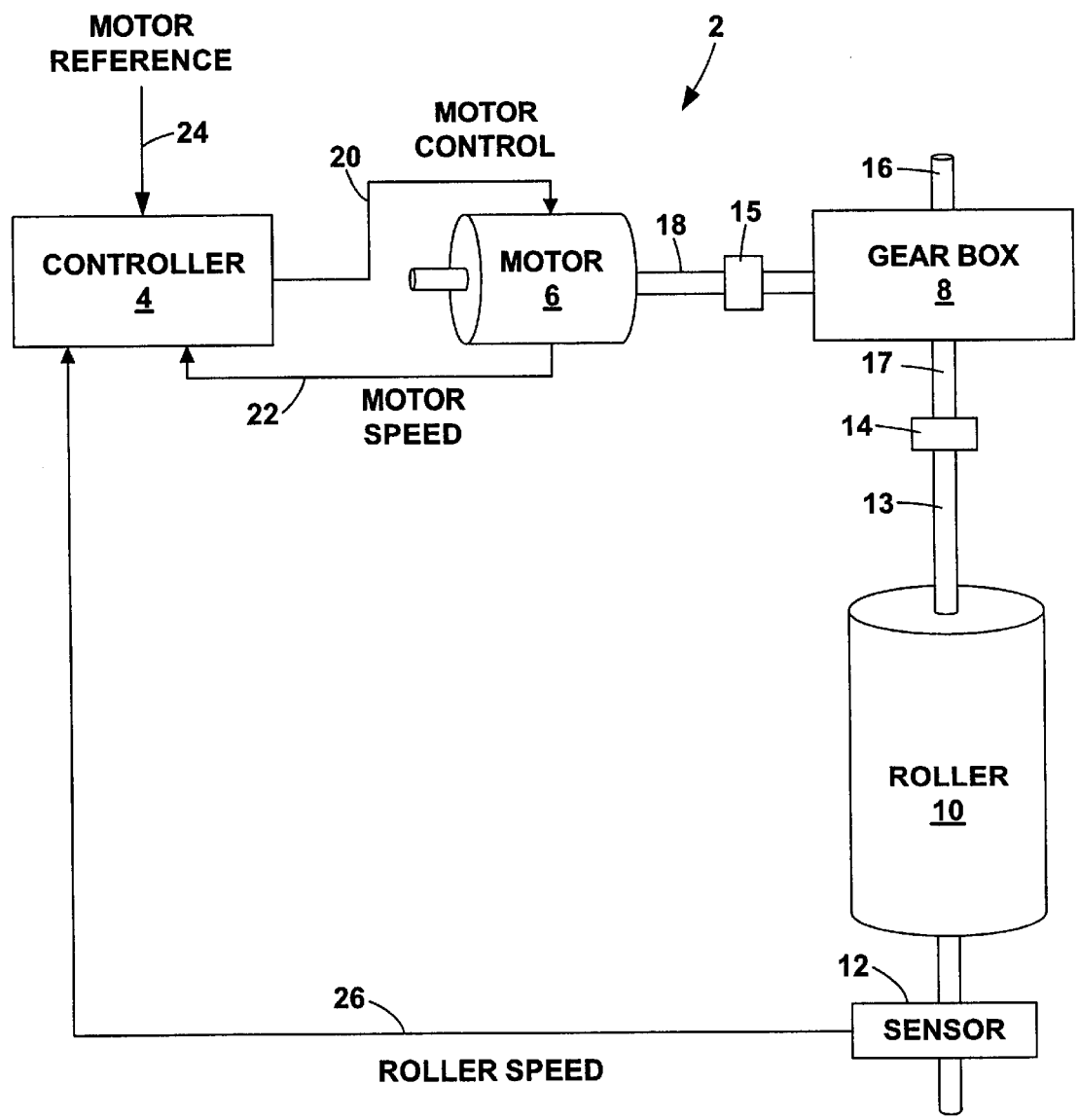
FIG. 1 is a block diagram illustrating an example system in which a controller provides adaptive, closed-loop control to reduce speed variations of a roller.

FIG. 1 is a block diagram illustrating an example system 2 in which a controller 4 provides adaptive, closed-loop control to reduce speed variations of a roller 10. In particular, the adaptive, closed-loop control techniques described herein can dynamically detect and reduce speed variations of roller 10 even though the speed variations may shift in amplitude, frequency and phase during the rotation. System 2 may be used in a variety of applications, including a continuous feed manufacturing environment to produce paper, film, tape, and the like. Although illustrated with reference to roller 10 for exemplary purposes, the invention is not so limited. The principles of the invention may be applied to adaptive, closed-loop control for any rotatable mechanical component, such as a roller, a casting wheel, a pulley, a gear, a pull roller, an extruder, a gear pump, and the like.

Controller 4 outputs motor control signal 20 to engage motor 6 and drive roller 10, which may be a precision web-handling roller within a manufacturing environment. In particular, in response to motor control signal 20, motor 6 drives shaft 18 that is mechanically coupled to gear box 8 via coupler 15. In turn, gear box 8 drives shaft 17 that is mechanically coupled to roller 10 via coupler 14. Gear box 8 may comprise a number of gears, such as twenty or more, to provide a suitable gear ratio to engage roller 10.

Controller 4 receives motor speed signal 22 indicative of the angular velocity of shaft 18, i.e., the current operating speed of motor 6. In addition, controller 4 receives from sensor 12 a roller speed signal 26 that represents the angular velocity of roller 10. Sensor 12 may, for example, comprise a sine encoder mounted to shaft 13 of roller 10, and may output a position-encoded roller speed signal. Controller 4 also receives a motor reference signal 24 that provides a target reference for driving motor 6. A process control unit or other device, for example, may provide motor reference signal 24 according to a manufacturing model. Motor reference signal 24 may comprise a motor speed reference signal, a motor torque reference signal, and a motor position reference signal, or the like.

Based on roller speed signal 26, motor speed signal 22, and a motor reference signal 24, controller 4 applies closed-loop control of motor 6 to counteract effects of variations in speed of roller 10. In particular, controller 4 detects and reduces speed variations of roller 10 that occur as roller 10 rotates in response to motor 6 even though the speed variations may shift in amplitude, frequency and phase during the rotation. These speed variations may be caused by a number of components of system 2, including gear box 8, couplers 14, 15 and other components (not shown) of system 2 such as sleeve bearings, cogging torque, gain offset of sensors and other anomalies that often affect fine motor control.

As described in detail below, controller 4 continuously samples roller speed signal 26 and generates a set of data elements that relate speed variations of roller 10 to angular position. In particular, controller 4 may store the set of data elements as a lookup table in which the data elements store angular velocity error data for a plurality of angular positions of roller 10. Controller 4 maintains the set to comprise sufficient data elements to span one or more revolutions of roller 10. By increasing the number of data elements to span more than one revolution of roller 10, controller 4 is able reduce the effects of lower frequency speed variations, i.e., speed variations having a period of more than one revolution.

The set of data elements relate speed variations of roller 10 to the angular positions of roller 10. For example, the set of data elements may comprise angular velocity error data for roller 10 at each of the angular positions. Accordingly, the lookup table may comprise N*M data elements, where the N*M data elements store angular velocity data for N angular positions over M revolutions of roller 10. Controller 4 maintains the set of data elements within a storage medium (not shown), such as a non-volatile random access memory (NVRAM), FLASH memory or the like. Alternatively, controller 4 may decompose the roller speed signal into frequency components, and identify destructive frequencies. In the embodiment, the set of data elements may comprise frequency, amplitude and phase data for the identified components.

Controller 4 continuously samples roller speed signal 26, recalculates the set of data elements, and adjusts motor control signal 20 based on the set of data elements. In this manner, controller 4 provides adaptive, closed-loop control of motor 6 to reduce or eliminate repetitive speed variations within roller 10.

Figure 2:
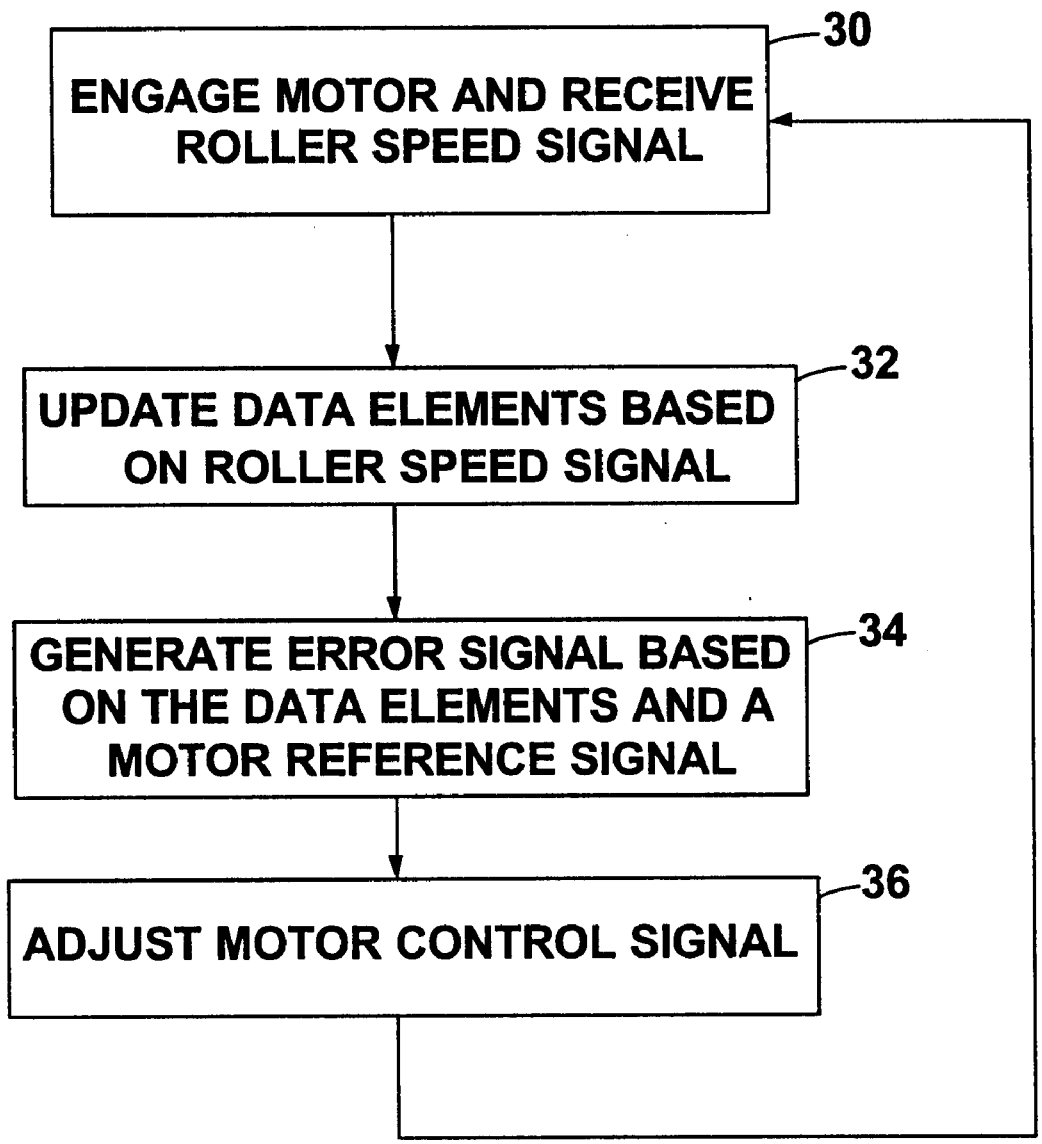
FIG. 2 is a flowchart providing a high-level overview of the operation of the controller.

FIG. 2 is a flowchart providing a high-level overview of the operation of controller 4. In real-time, controller 4 engages motor 6 to drive roller 10, and receives roller speed signal 26 that includes a measure of the angular velocity of roller 10 (30). Controller 4 processes roller speed signal 26 and updates the set of data elements to relate speed variations of roller 10 to angular position (32). In particular, controller 4 may continuously sample roller speed signal 26 and calculate discrete velocity error data for each of the angular positions. Alternatively, controller 4 may decompose the roller speed signal into frequency components and store the frequency information in the set of data elements.

Next, controller 4 generates an error signal based on the data elements and a motor reference signal, such as a motor speed reference, motor torque reference or a motor position reference (34). Controller 4 adjusts motor control signal 20 based on the error signal (36). In this manner, controller 4 provides adaptive, closed-loop control of motor 6 to reduce or eliminate repetitive speed variations within roller 10.

Figure 3:
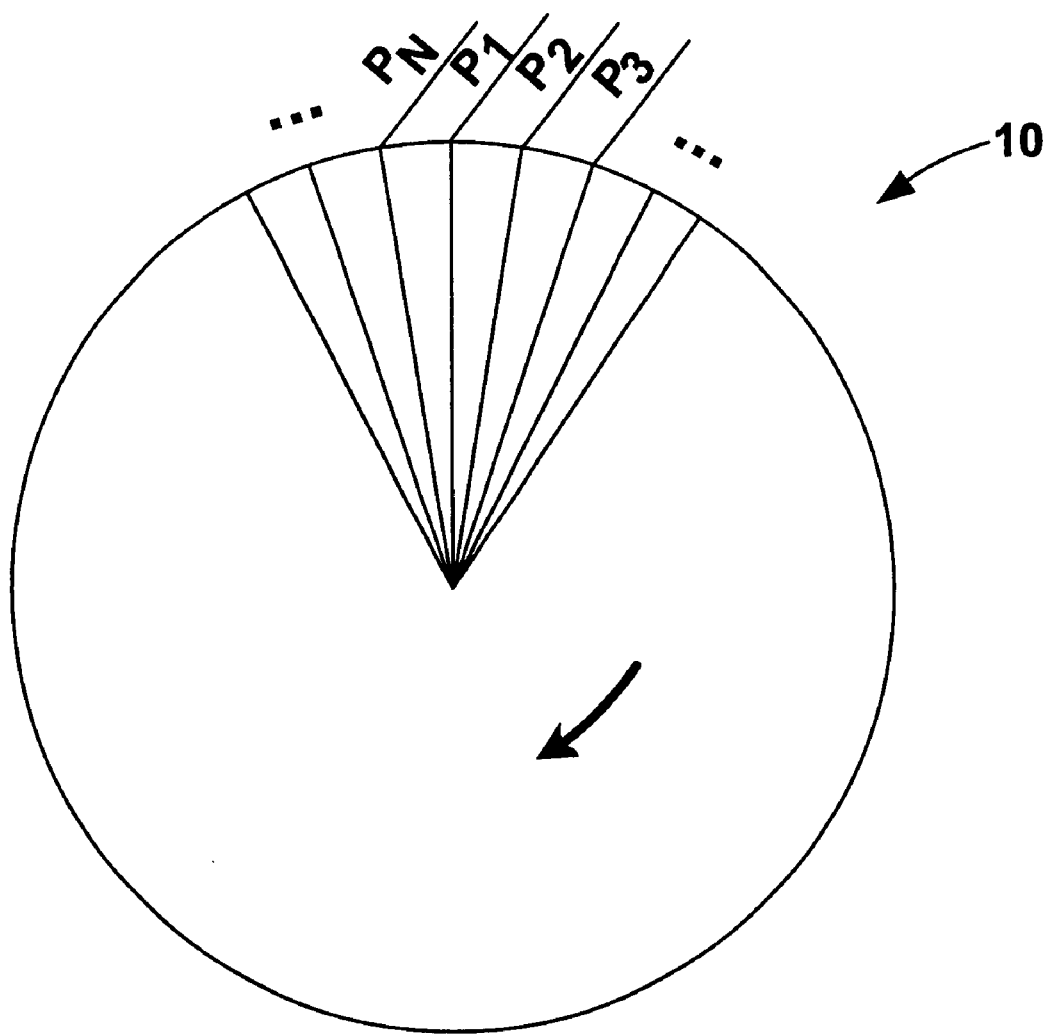
FIG. 3 is a block diagram illustrating a mapping of N angular positions to the roller to span a complete revolution.

FIG. 3 is a block diagram illustrating a mapping of N angular positions ($P_1$–$P_N$) to roller 10 to span a complete revolution. The maximum number of positions per revolution is typically a function of the angular velocity of roller 10 and the processing speed of controller 4 as follows:

$$\frac{T_R}{T_c * 2} = P_{\text{MAX}}$$

where $P_{MAX}$ is the maximum number of positions, $T_R$ is the time per revolution of roller 10, and $T_C$ is the scan time of controller 4. For example, assuming a time of 10.00 seconds for one revolution of roller 10, and a scan time of 6.5 ms for controller 4, the maximum number of positions would be 769.23. Accordingly, N could be set to 720, which is less than the maximum positions of 769.23, to conveniently allocate a position for every half-degree of roller 10. Accordingly, controller 4 may maintain a lookup table of 1440 data elements to span two revolutions of roller 10. In other embodiments, a much larger lookup table may be implemented to store data elements for a number of revolutions to improve quantification of lower frequency speed variations, i.e., speed variations having a period of more than one revolution.

Figure 4A:
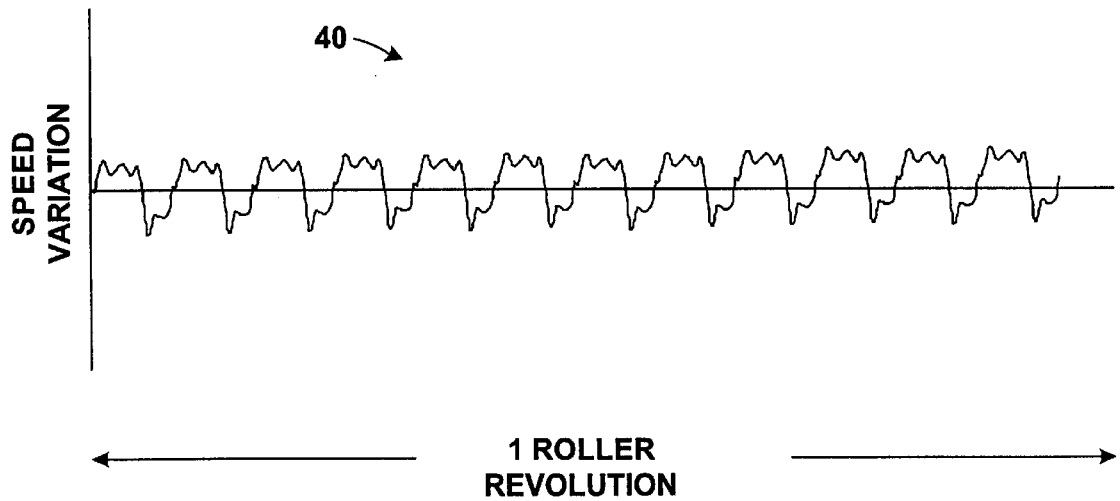
FIG. 4A is a graph illustrating example velocity error of the roller when the controller is not engaged to reduce speed variations.
Figure 4B:
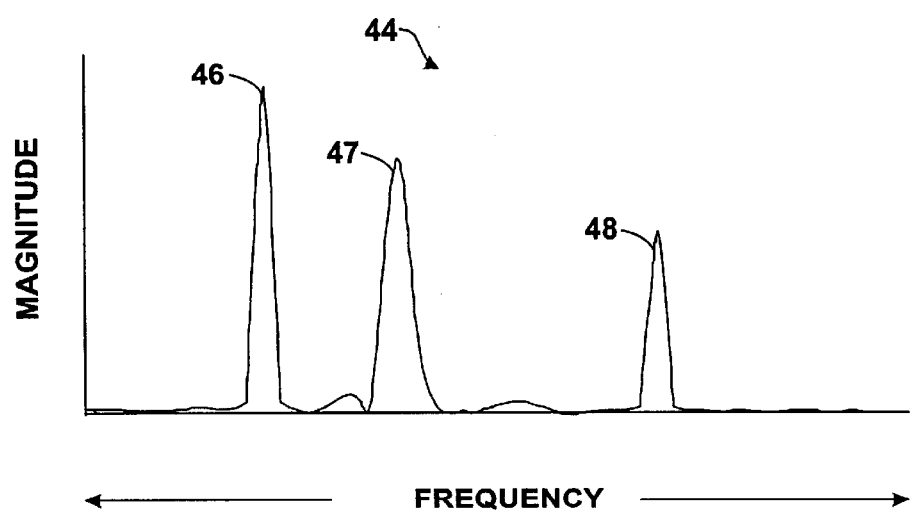
FIG. 4B is a graph illustrating example velocity error of the roller within the frequency domain when the controller is not engaged to reduce speed variations.

FIG. 4A is a graph 40 illustrating example velocity error of roller 10 when controller 4 is not engaged to reduce speed variations. In particular, graph 40 plots the velocity error of roller 10 versus time over one revolution of roller 10. FIG. 4B is a graph 44 illustrating example velocity error of roller 10 within the frequency domain when controller 4 is not engaged to reduce speed variations. Notably, graph 44 highlights two example destructive frequencies 46, 48 present within the velocity error of roller 10. These frequencies may be caused by one or more of a number of components of system 2, including gear box 8, couplers 14, 15 and other components (not shown) of system 2. Graph 44 also illustrates a non-destructive frequency 47 that can be caused by the speed-measuring device, such as sensor 12.

Figure 4C:
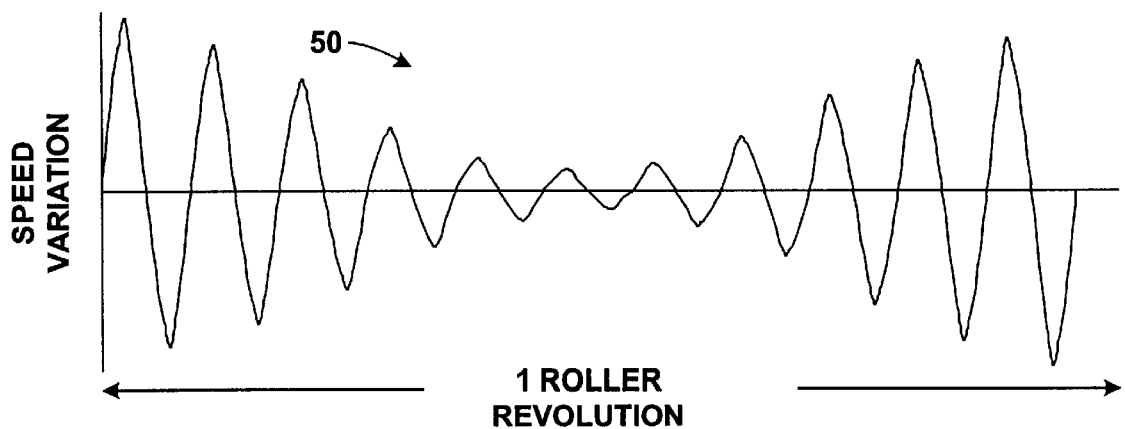
FIG. 4C is a graph illustrating in further detail a destructive frequency of changing amplitude and phase over one revolution of the roller.

FIG. 4C is a graph 50 illustrating in further detail one of the destructive frequencies 46, 48 in time over one revolution of roller 10. In particular, graph 50 illustrates an example loading of gear box 8 on motor 6 that takes the form of a sine wave pattern between a forward load and a reverse load. Backlash, shaft torsion and coupling torsion, for example, may cause a phase shift between roller 10 and motor 6.

Figure 4D:
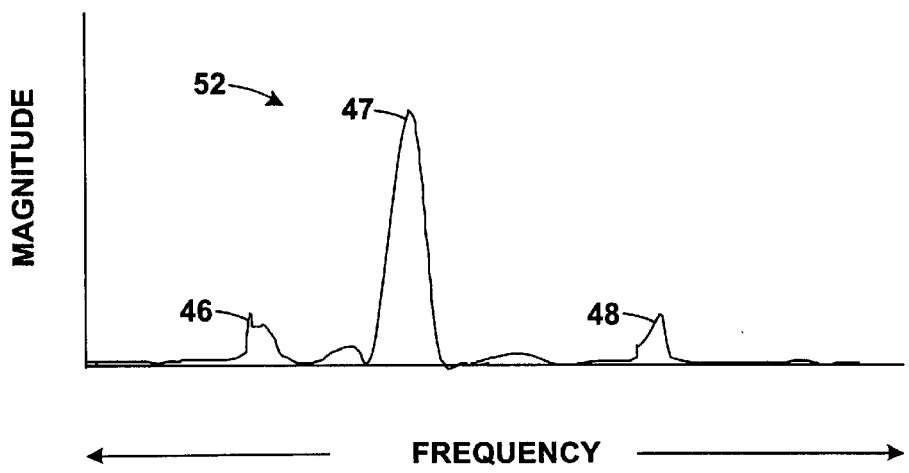
FIG. 4D is a graph illustrating example velocity error of the roller within the frequency domain when the controller has been engaged to adaptively reduce speed variations.

FIG. 4D is a graph 52 illustrating example velocity error of roller 10 within the frequency domain when controller 4 has been engaged to reduce speed variations. In particular, graph 52 illustrates how controller 4 can reduce the two example destructive frequencies 46, 48. Reduction of speed variations, including greater than ten to fifteen times reduction in speed variations, have been achieved in practice. Furthermore, graph 52 illustrates that controller 4 can be configured to ignore non-destructive frequencies, such as non-destructive frequency 47. In particular, controller 4 may be readily configured to decompose the roller speed signal into frequency components, and to selectively compensate for the identified components.

Figure 5A:
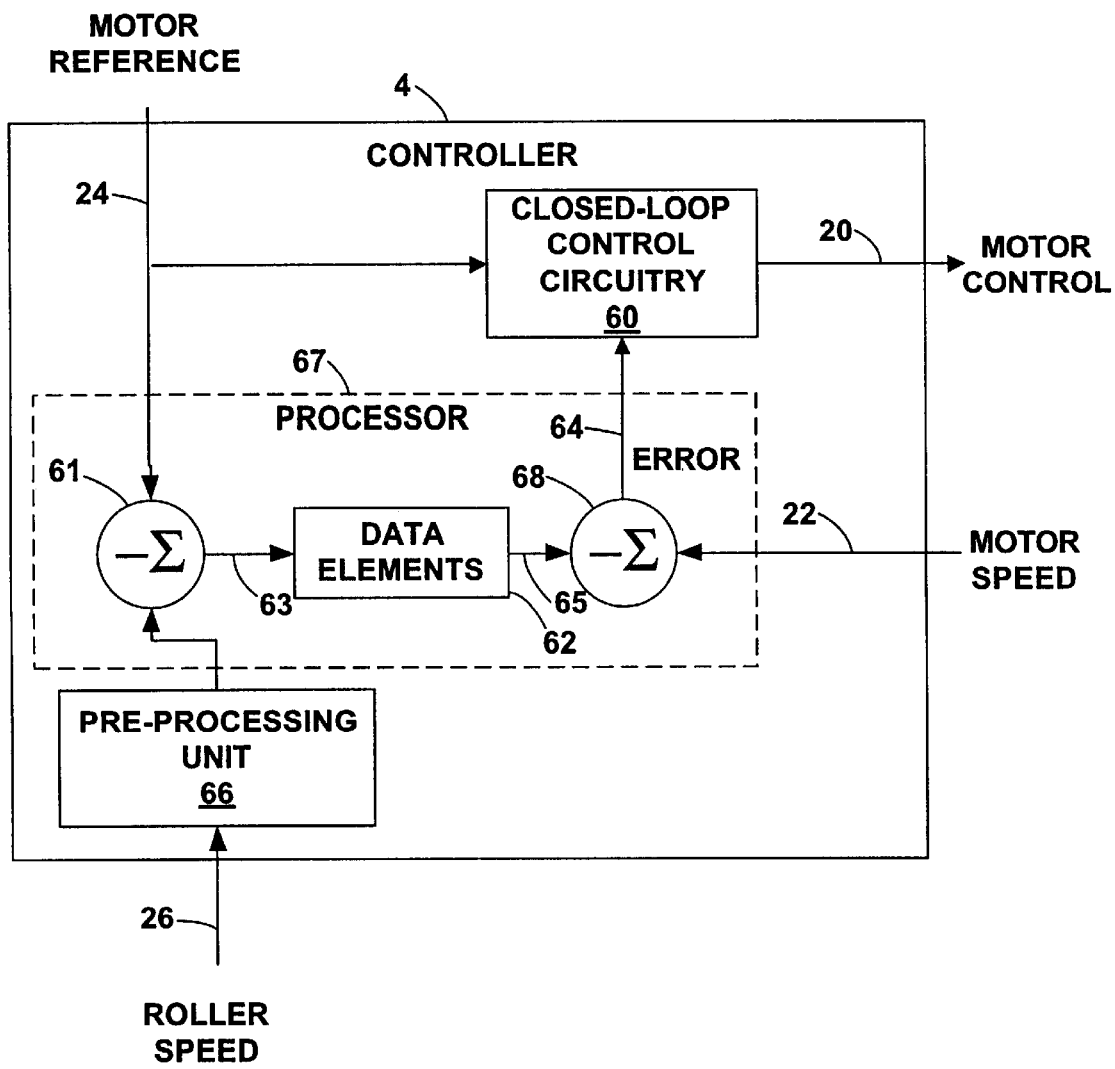
FIG. 5A is a block diagram illustrating an example embodiment of the controller in further detail.

FIG. 5A is a block diagram illustrating an example embodiment of controller 4 in further detail. Controller 4 includes closed-loop control circuitry 60 to output motor control signal 20 based on motor reference signal 24 and error signal 64. To generate error signal 64, controller 4 receives and processes roller speed signal 26 from sensor 12.

Initially, pre-processing unit 66 amplifies roller speed signal 26 and converts the signal from sine lines to line pulses. In addition, pre-processing unit 66 generates a high-resolution pulse count, such as 3,600,000 pulses per revolution, based on the line pulses of roller speed signal 26. Pre-processing unit 66 may also apply a filter, such as a low-pass filter, to remove noise from roller speed signal 26.

Based on the pulse count, processor 67 calculates a current angular velocity of roller 10, and generates a set of data elements 62 that relates velocity error of roller 10 to angular position. For example, processor 67 may subtract the angular velocity from motor reference signal 24 to determine a velocity difference 63. Alternatively, processor 67 may make use of a torque reference signal, a position reference signal, and the like. Based on the calculated difference 63, processor 67 continuously updates the set of data elements 62. Processor 67 may store the set of data elements 62 as a lookup table in which the data elements store angular velocity error data for a plurality of angular positions of roller 10. In addition, processor 67 may store the set of data elements within a storage medium, such as a non-volatile random access memory (NVRAM), FLASH memory or the like. The storage medium may be internal or external to the processor. Processor 67 may comprise an embedded microprocessor, conventional microprocessor, a digital signal processor (DSP), dedicated computational hardware, and the like.

To counteract effects of variations in speed of roller 10, processor 67 generates error signal 64 based on motor speed signal 22 and data elements 62. Specifically, processor 22 generates a signal 65 from the data elements 62 to represent velocity error as a function of the angular position of roller 10, and subtracts signal 65 from motor speed signal 22. Processor 67 introduces error signal 64 into closed-loop control circuitry 60 for adjusting motor control signal 20. In this manner, closed-loop control circuitry 60 may be any conventional closed-loop control mechanism for controlling motor 6.

Alternatively, pre-processing unit 66 may decompose the roller speed signal into frequency components, and identify destructive frequencies. Pre-processing unit 66 may, for example, perform a Fast Fourier Transform (FFT) on roller speed signal 26 to identify the frequency components of the angular velocity. In that case, the processor 67 may generate the set of data elements 62 to comprise frequency, amplitude and phase data for the identified components. In a most preferred embodiment, the present invention may combine the use of both frequency components and time components to resolve variability associated with the mechanical component.

Figure 5B:
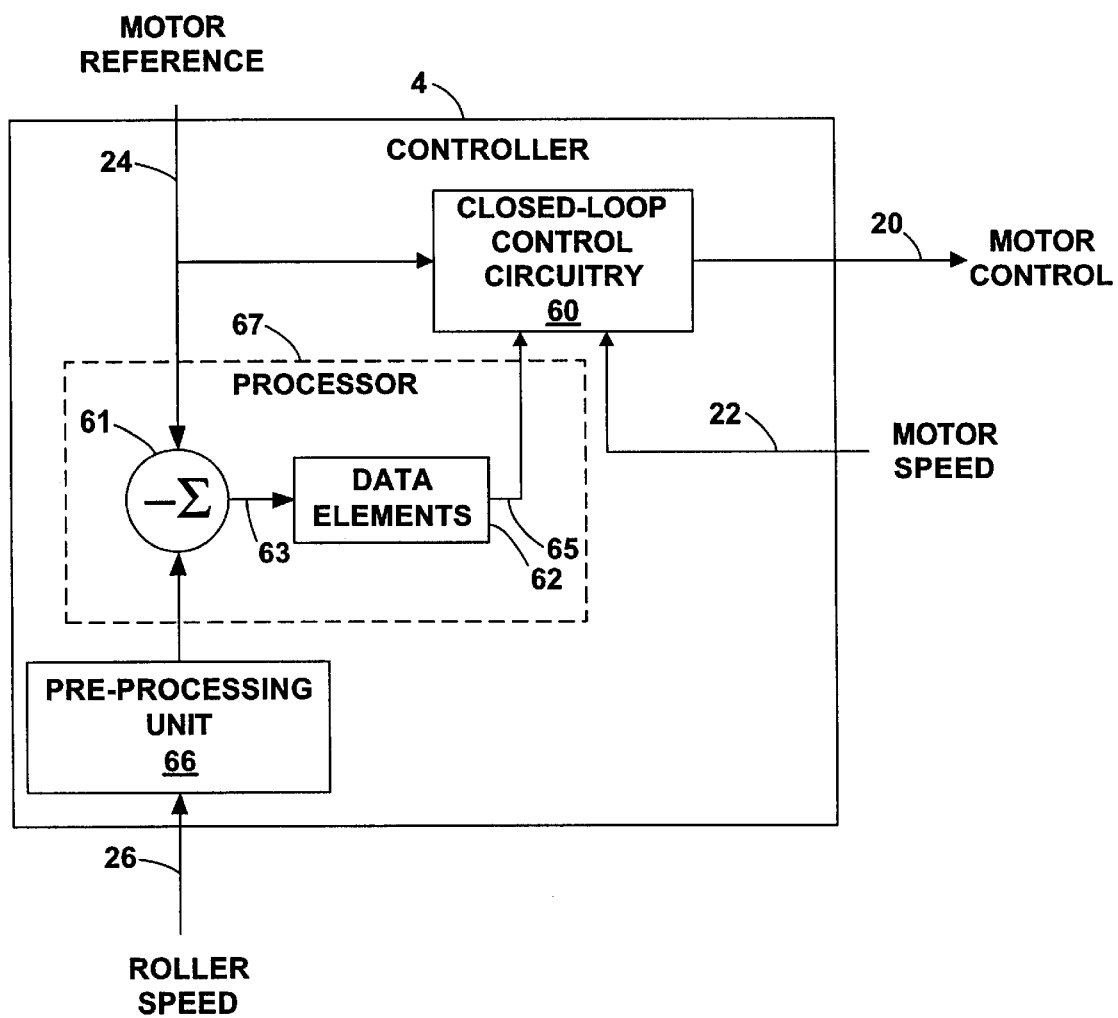
FIGS. 5B–5D are block diagrams illustrating a variety of embodiments for the controller.
Figure 5C:
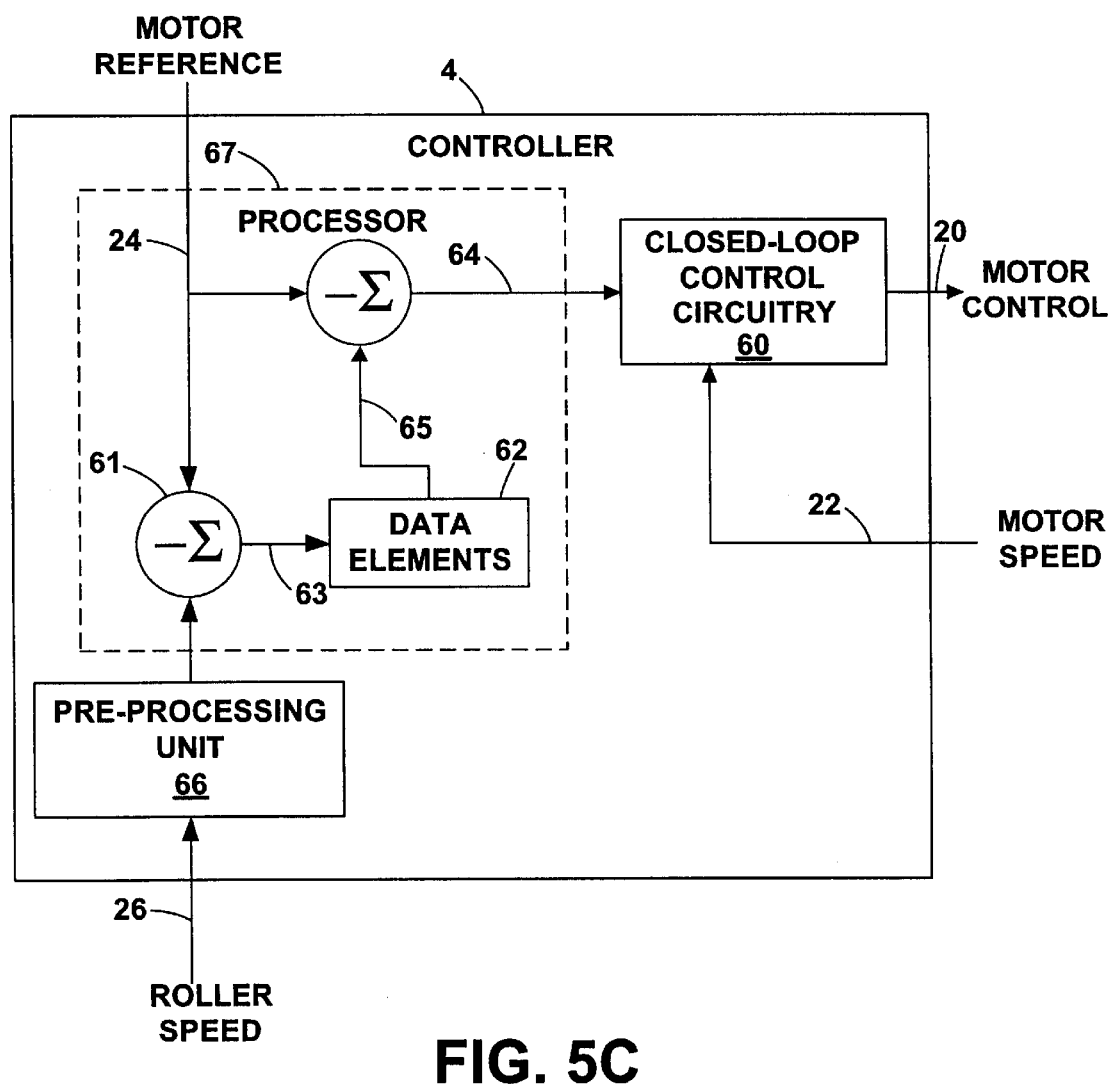
Figure 5D:
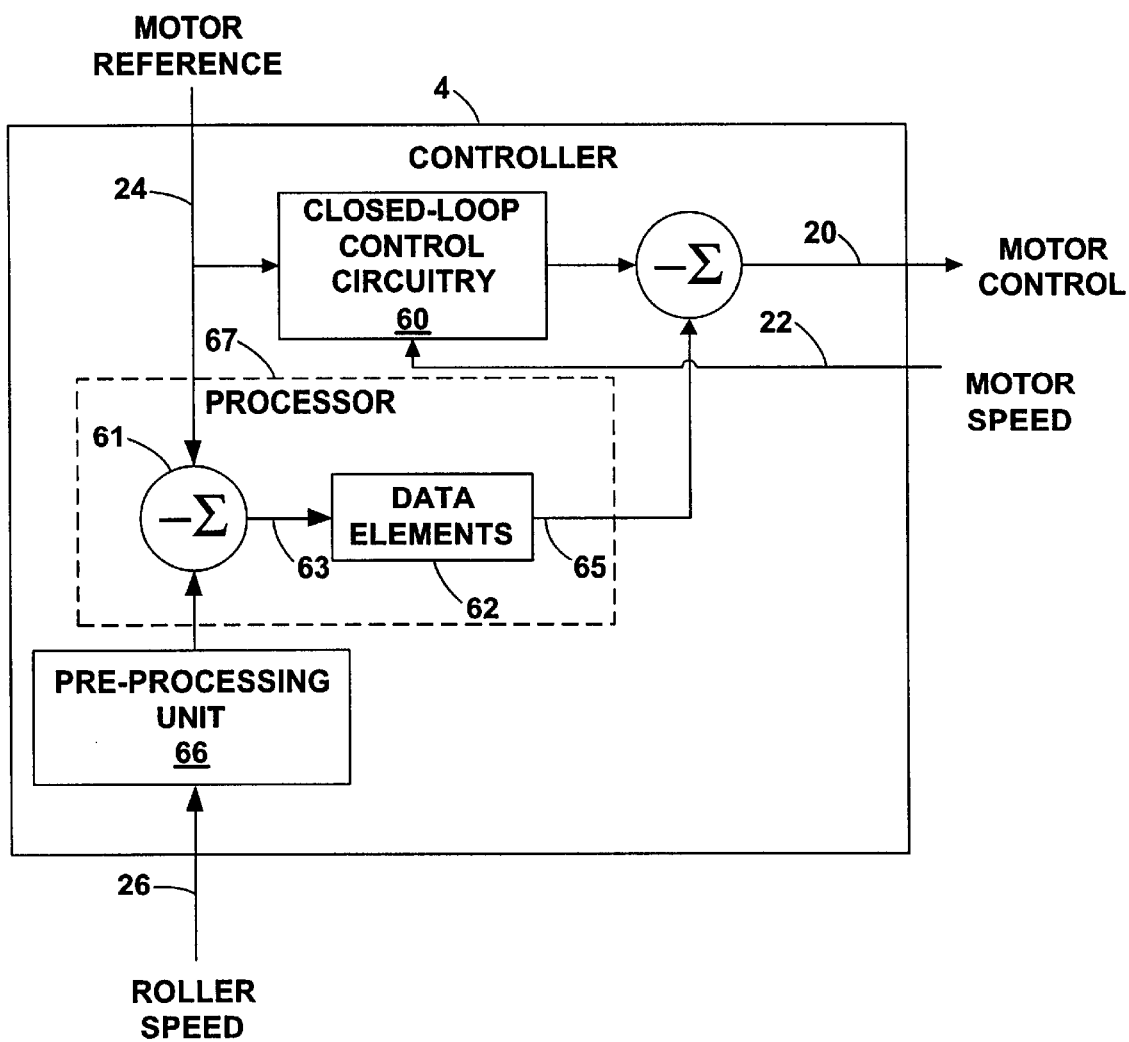

The arrangement of controller 4 may vary. In particular, signal 65, error signal 64 and summers 61, 68 may be rearranged or eliminated. FIGS. 5B–5D are block diagrams illustrating a variety of exemplary embodiments for controller 4. In view of FIGS. 5A–5D, other configurations may also become apparent to a person with skill in the art.

Figure 6:
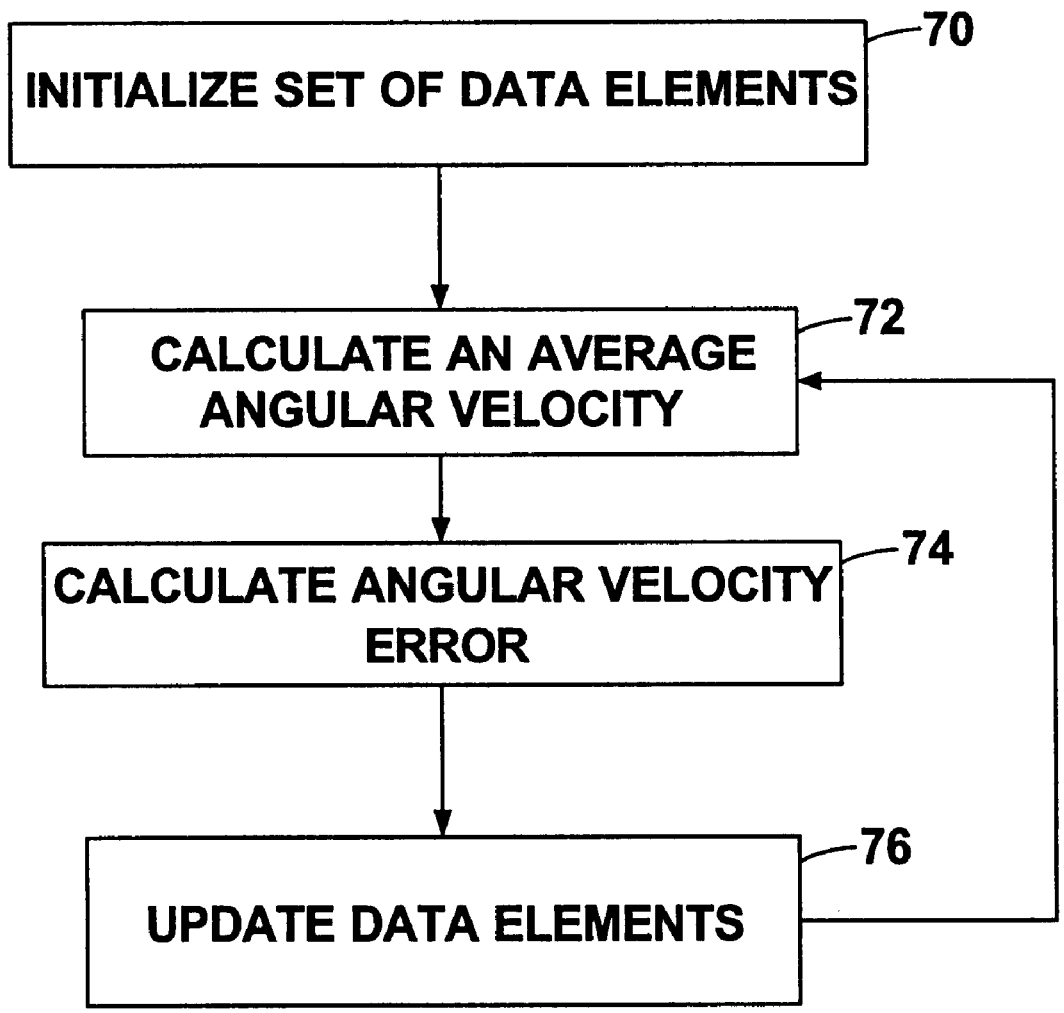
FIG. 6 is a flowchart illustrating one example mode of operation of a processor of the controller when generating data elements relating velocity error to angular positions of the roller.

FIG. 6 is a flowchart illustrating one example mode of operation of processor 67 when generating data elements 62. Initially, such as during the first revolution of roller 10 for a particular set point, processor 67 receives the pulse count from pre-processing unit 66 and initializes data elements 62 with velocity error as a function of angular position (70). For example, processor 67 may subtract the angular velocity measured at each angle from motor reference signal 24.

After initializing the data elements 62 (70), processor 67 continuously updates each of data elements 62. Specifically, for each angular position, by processor 67 calculates an average velocity of roller 10 (72), and calculates an angular velocity error for the current angular position (74), such as by subtracting the average angular velocity from a reference velocity. Processor 67 may, for example, calculate an average angular velocity for the current angular position based on measured angular velocities for the current angular position and number of proceeding angular positions. Based on the current angular position, processor 67 updates one of data elements 62 as a function of the calculated velocity error (76). For example, for a current angular position P and a current revolution R, processor 67 may update data elements 62 as follows:

$$\text{DATA}[P*R-1]=\text{DATA}[P*R-1]+(V_{REF}-V_{AVG})*C \quad 0<=P<N, 0<=R<M$$

where DATA represents data elements 62 stored in linear fashion as a lookup table having M*N data elements, $V_{REF}$ represents motor reference signal 24, and $V_{AVG}$ represents the calculated average angular velocity, and C represents a constant. The constant C may be used as a digital low pass filter to reduce the effects of noise, and may have a typical value of 0.5.

FIG. 7 is a block diagram illustrating an example set of data elements 90. In particular, data elements 90 includes M*N data elements. Each element corresponds to an angular position and a revolution of roller 10. In the illustrated embodiment, each element stores velocity error data, which could be stored as angular velocity error, linear velocity error considering the diameter of roller 10, as a percentage error, and the like.

Element P1, for example, indicates a linear velocity error of +1.2004 feet per minute (FPM).

FIG. 8 is a block diagram illustrating another example set of data elements 92. In particular, the set of data elements 92 relate velocity error to position by storing data describing destructive frequencies within roller speed signal 26. As described above, controller 4 may decompose roller speed signal into frequency components. In this mode of operation, each of data elements in the set 92 maintains data describing a unique destructive frequency, such as the frequency, amplitude and phase relative to the position of roller 10.

Although described in reference to closed-loop control of a rotatable mechanical component, the techniques may readily be applied to provide adaptive, closed-loop control of a mechanical component that may be repetitively actuated to traverse a linear or non-linear path. In particular, the controller may generate a set of data elements to relate variations in the linear velocity of the mechanical component to positions along the path.

Various embodiments of the invention have been described. These and other embodiments are within the scope of the following claims.

What is claimed is:

1. A method comprising:
   receiving a speed signal representing angular velocity of a rotatable mechanical component;
   generating a set of data elements from the speed signal, wherein the set of data elements comprises angular velocity error data for the mechanical component at each of a plurality of angular positions;
   generating an error signal based on the set of data elements to represent an angular velocity error as a function of the angular position of the mechanical component; and
   adjusting a motor control signal based on the error signal.

2. The method of claim 1, wherein generating an error signal comprises combining the motor speed signal with the data elements to produce the error signal.

3. The method of claim 1, wherein generating a set of data elements comprises storing the set of data elements as a lookup table, wherein the data elements of the lockup table comprise angular velocity error data for the angular positions.

4. The method of claim 3, wherein the lookup table comprises N*M data elements, wherein the N*M data elements store angular velocity data for N angular positions over M revolutions of the mechanical component.

5. The method of claim 1, further comprising outputting the motor control signal from a controller to engage a motor.

6. The method of claim 5, wherein adjusting the motor control signal comprises introducing the error signal into closed-loop control circuitry of the controller.

7. The method of claim 1, wherein adjusting the motor control signal comprises adding the error signal to a motor reference signal.

8. The meted of claim 7, wherein the motor reference signal comprises one of a motor speed reference signal, a motor torque reference signal, and a motor position reference signal.

9. The method of claim 1, wherein adjusting the motor control signal comprises inverting the error signal.

10. The method of claim 1, further comprising defining the plurality of angular positions to span one revolution of the mechanical component.

11. The method of claim 1, wherein generating the data elements comprises decomposing the speed signal into frequency components.

12. The method of claim 11, wherein the data elements represent amplitudes and phases of the frequency components.

13. The method of claim 11, further comprising generating the error signal to contain the frequency components.

14. The method of claim 1, further comprising updating each of the data elements by:
   (a) measuring an angular velocity of the mechanical component for a subset of the angular positions;
   (b) calculating an average velocity of the mechanical component over the subset of the angular positions;
   (c) subtracting the average angular velocity from a reference angular velocity to produce an angular velocity error;
   (d) storing the angular velocity error within the set of data elements based on a current angular position of the mechanical component; and
   (e) repeating (a) through (d) for each of the angular positions of the mechanical component.

15. A medium comprising instructions to cause a processor to:
   receive a speed signal representing angular velocity of a rotatable mechanical component as a function of angular position;
   generate a set of data elements from the speed signal, wherein the set of data elements relates speed variations of the mechanical component to angular positions of the mechanical component, and further wherein the set of data elements comprises angular velocity error data for the mechanical component at each of the plurality of annular positions;
   generate an en-or signal based on the set of data elements; and
   adjust a motor control signal based on the error signal.

16. The medium of claim 15, further comprising instructions to cause the processor to combine the motor speed signal with the data elements to produce the error signal representing angular velocity error as a function of the angular position of the rotatable mechanical component.

17. The medium of claim 15, further comprising instructions to cause the processor to output the motor control signal based on a motor reference signal and the error signal.

18. The medium of claim 15, further comprising instructions to cause the processor to decompose the speed signal into frequency components.

19. A system comprising:
a motor operable to drive a rotatable mechanical component in response to a motor control signal;
a sensor to generate a speed signal representing angular velocity of the mechanical component; and
a controller to generate a set of data elements based on the speed signal, wherein the set of data elements relates speed variations of the mechanical component to a plurality of angular positions of the mechanical component, and further wherein the set of data elements comprise angular velocity error data for the mechanical component at the angular positions, and the controller adjusts the motor control signal based on the set of data elements.

20. The system of claim 19, wherein the sensor outputs a position-encoded speed signal.

21. The system of claim 19, wherein the controller generates an error signal based on the speed signal and a motor speed reference signal, and further wherein the controller converts the error signal to digital values and stores the digital values on a medium as the set of data values.

22. The system of claim 19, wherein the sensor is mounted to a shaft of the mechanical component.

23. The system of claim 19, wherein the controller stores the set of data elements within a storage medium as a lookup table, wherein the data elements of the lookup table comprise angular velocity error data for the angular positions.

24. The system of claim 23, wherein the lookup table comprises N*M data elements, wherein the N*M data elements store angular velocity data for N angular positions over M revolutions of the mechanical component.

25. The system of claim 19, wherein the plurality of angular positions span one revolution of the mechanical component.

26. The system of claim 19, wherein the controller generates an error signal based on the set of data values.

27. The system of claim 26, wherein the controller includes closed-loop control circuitry to output the motor control signal based on the error signal and a motor reference signal.

28. The system of claim 27, wherein the motor reference signal comprises one of a motor speed reference signal, a motor torque reference signal, and a motor position reference signal.

29. The system of claim 19, wherein the controller decomposes the speed signal into frequency components.

30. The system of claim 29, wherein the data elements represent amplitudes and phases of the frequency components.

31. The system of claim 29, wherein the controller generates an error signal to contain the frequency components, and introduces the error signal as feedback into closed-loop circuitry to adjust the motor control signal.

32. The system of claim 19, wherein the controller updates the data elements by:
(a) measuring an angular velocity of the mechanical component for a subset of the angular positions;
(b) calculating an average velocity of the mechanical component over the subset of the angular positions;
(c) subtracting the average angular velocity from a reference angular velocity to produce an angular velocity error;
(d) storing the angular velocity error within the set of data elements based on a current angular position of the mechanical component; and
(e) repeating (a) through (d) for each of the angular positions of the mechanical component.

33. The system of claim 19, wherein the mechanical component comprises one of a roller, a casting wheel, a pulley, a gear, a pull roller, an extruder, and a gear pump.

34. A system comprising:
a motor operable to drive a mechanical component along a path in response to a motor control signal;
a sensor to generate a speed signal representing a linear velocity of the mechanical component; and
a controller to generate a set of data elements based on the speed signal, wherein the set of data elements relates speed variations of the mechanical component to a plurality of positions of the mechanical component, and further wherein the controller adjusts the motor control signal based on the set of data elements.

35. The system of claim 34, wherein the sensor outputs a position-encoded speed signal.

36. The system of claim 34, wherein the set of data elements comprise linear velocity error data for the mechanical component at the positions.

37. The system of claim 34, wherein the controller generates an error signal based on the speed signal and a motor speed reference signal, and further wherein the controller converts the error signal to digital values and stores the digital values on a medium as the set of data values.

38. The system of claim 34, wherein the controller stores the set of data elements within a storage medium as a lookup table having N*M data elements, wherein the N*M data elements store velocity data for N positions over M linear actuations of the mechanical component.

39. The system of claim 34, wherein the plurality of positions span one linear actuation of the mechanical component.

40. The system of claim 34, wherein the controller generates an error signal based on the set of data values.

41. The system of claim 40, wherein the controller includes closed-loop control circuitry to output the motor control signal based on the error signal and a motor reference signal.

42. The system of claim 41, wherein the motor reference signal comprises one of a motor speed reference signal, a motor torque reference signal, and a motor position reference signal.

43. The system of claim 34, wherein the controller decomposes the speed signal into frequency components.

44. The system of claim 43, wherein the data elements represent amplitudes and phases of the frequency components.

45. The system of claim 43, wherein the controller generates an error signal to contain the frequency components, and introduces the error signal as feedback into closed-loop circuitry to adjust the motor control signal.

* * * * *

UNITED STATES PATENT AND TRADEMARK OFFICE
CERTIFICATE OF CORRECTION

PATENT NO. : 6,690,989 B2
DATED : February 10, 2004
INVENTOR(S) : Kent J. Spindler It is certified that error appears in the above-identified patent and that said Letters Patent is hereby corrected as shown below:

Column 7,
Line 65, "lockup" should be shown as -- lookup --.

Column 8,
Line 57, "en-or" should be shown as -- error --.

Signed and Sealed this

Fifteenth Day of June, 2004

JON W. DUDAS
*Acting Director of the United States Patent and Trademark Office*